United States Patent [19]

McCutchan, Jr.

[11] Patent Number: 4,473,363
[45] Date of Patent: Sep. 25, 1984

[54] COMPOSITE PLASTIC AND METAL PULLEY CONSTRUCTION

[76] Inventor: Ben O. McCutchan, Jr., 7748 Aramis St., NW., Massillon, Ohio 44646

[21] Appl. No.: 294,578

[22] Filed: Aug. 20, 1981

[51] Int. Cl.³ .................... F16H 55/30; F16H 55/36; F16H 55/46
[52] U.S. Cl. .................................. 474/161; 474/168; 474/170; 474/190; 474/902
[58] Field of Search ............... 474/161, 168, 170, 177, 474/178, 190, 902, 191; 74/446, DIG. 10, 439, 447, 449

[56] References Cited

U.S. PATENT DOCUMENTS

| | | | |
|---|---|---|---|
| 2,198,831 | 4/1940 | Moyer | 474/177 |
| 2,869,223 | 1/1959 | Killian et al. | 29/159 R |
| 3,257,860 | 6/1966 | Runde et al. | 474/161 X |
| 3,304,796 | 2/1967 | Leege | 74/464 |
| 3,469,466 | 9/1969 | Heathwaite et al. | 474/161 |
| 3,469,468 | 9/1969 | Cozzarin et al. | 474/161 |
| 3,557,424 | 1/1971 | Heathwaite et al. | 29/159.2 |
| 3,590,456 | 7/1971 | Seamen | 474/161 |
| 3,651,705 | 3/1972 | Bertinetti et al. | 474/161 |
| 3,696,685 | 10/1972 | Lampredi | 474/161 |
| 3,772,928 | 11/1973 | Gobeille | 474/170 |
| 3,788,155 | 1/1974 | Cigala et al. | 474/177 |
| 3,839,921 | 10/1974 | Haug | 474/161 X |
| 3,908,421 | 9/1975 | Killian et al. | 72/82 |
| 3,977,264 | 8/1976 | Sproul | 474/170 |
| 3,991,598 | 11/1976 | Kraft | 72/83 |
| 3,995,474 | 12/1976 | Kraft | 72/83 |
| 4,364,736 | 12/1982 | Hetz | 474/168 |
| 4,366,609 | 1/1983 | Speer | 474/177 |

FOREIGN PATENT DOCUMENTS

| | | | |
|---|---|---|---|
| 1100747 | 9/1955 | France . | |
| 148088 | 5/1981 | German Democratic Rep. | 474/170 |
| 197806 | 8/1977 | Netherlands | 74/DIG. 10 |

Primary Examiner—Lawrence J. Staab
Assistant Examiner—Michael D. Bednarek
Attorney, Agent, or Firm—Frease & Bishop

[57] ABSTRACT

A composite plastic and metal pulley intended primarily for use with an endless drive belt for vehicle accessories, particularly an alternator. The pulley is formed by a hollow cylindrical-shaped molded plastic member having a series of outwardly opening V-shaped belt-receiving grooves on the outer surface thereof. A flat disc-shaped metal member is mounted within the central bore of the plastic member perpendicular to the longitudinal axis thereof. The outer edge of the metal disc is scalloped and is embedded firmly within the plastic to prevent rotation of the disc with respect to the plastic member. A central opening is formed in the disc for mounting the pulley on the extended end of the alternator shaft.

3 Claims, 6 Drawing Figures

COMPOSITE PLASTIC AND METAL PULLEY CONSTRUCTION

CROSS-REFERENCE TO RELATED PATENT APPLICATION

The new construction in this application comprises an improvement on the device disclosed in the copending U.S. application of Applicant, Ser. No. 273,237, filed June 12, 1981 and owned by and assigned to the assignee of this application.

BACKGROUND OF THE INVENTION

1. Field of the Invention

The invention relates to V-grooved pulleys for use with the endless drive belt of a vehicle accessories drive system and particularly for the alternator drive pulley. More particularly, the invention relates to a composite pulley in which the body or hub of the pulley is formed of a flat metal disc which is bonded within a multi-V-groove belt-receiving formation formed of a molded plastic.

2. Description of the Prior Art

There is a trend today in the automobile industry to operate the various vehicle accessories such as the power steering pump, air pumps, air conditioning and alternator by a single endless drive belt driven by a pulley connected to the engine crankshaft. This system is referred to as a "serpentine" drive belt system. This has resulted in the need for strong, efficient and reliable operating pulleys for driving the various vehicle accessories by their connection to the serpentine drive belt. These pulleys must have accurately formed V-grooves, dynamic pulley balance, and thick, rigid and strong areas in which the pulley grooves are formed.

Heretofore, such multi-V-grooved pulleys were formed completely of metal. A cup-shaped blank was either die stamped or roller spun from metal sheets with the V-grooves being subsequently stamped, slit or roller spun in an outer wall portion thereof. Examples of such all-metal pulleys are shown in U.S. Pat. Nos. 2,869,223, 3,908,421, 3,995,474 and 3,991,598.

These spun metal pulleys are formed with the usual single, double or triple V-shaped belt-receiving grooves in which the V-groove-forming walls are either equal in thickness or thinner than the thickness of the parent metal of the pulley wall in which the grooves are formed. Also, these prior art grooves have generally rounded crests and valleys between adjacent grooves and are adapted to receive a plurality of individual drive belts having the usual inverted trapezoidal cross-sectional configurations and not the particular cross-sectional configurations of the serpentine drive belts.

One known pulley which has been produced for use with these serpentine drive belts and which eliminates many of the problems and difficulties encountered with prior pulleys is shown in U.S. Pat. No. 3,977,264. This patent discusses the problems and difficulties that are involved in forming a satisfactory pulley construction having the required multi-V-groove belt-receiving formation in an outer portion thereof for the serpentine drive belts. Although pulleys formed by the metal-working procedure of U.S. Pat. No. 3,772,928 provide a satisfactory and efficient pulley, it is believed that a composite pulley formed of plastic and metal provides a construction which is less expensive, lighter in weight, and has strength comparable with the all-metal pulleys heretofore used.

Composite pulleys formed of plastic and metal are not new, per se. U.S. Pat. Nos. 3,557,424, 3,651,705 and 3,696,685 illustrate examples of composite plastic and metal pulleys of the type in which the outer pulley surface is formed with a series of teeth for use with a toothed belt drive. U.S. Pat. Nos. 3,772,928 and 3,788,155 are examples of two known composite plastic metal pulleys in which the pulley is formed with a V-groove in an outer portion thereof. The plastic formation in which the V-grooves of these two known pulleys are formed use internal and external metal reinforcement to strengthen the grooves and use a considerable amount of plastic material. Unbalanced pulleys could result with such prior composite constructions if the plastic reinforcing metal tabs or members are not completely uniform and symmetrical throughout the metal body. Also, formation of these tabs requires another manufacturing operation and additional equipment, thereby increasing the cost of the final pulley product. Furthermore, the V-grooves of these two pulleys are of the type having a cross-sectional configuration adapted for receiving individual drive belts having a usual inverted trapezoidal cross-sectional configuration as the heretofore all-metal belt-receiving pulleys.

The problems of forming an all-metal pulley are even greater for the alternator pulley since it is considerably smaller than the pulleys used for the other vehicle accessories. This smaller size pulley enables greater belt wrap to be obtained, and, correspondingly, achieves less slippage and improved efficiency, and obtains a higher rotational speed for increased alternator efficiency. This small size pulley makes it extremely difficult to satisfactorily and inexpensively blank and draw cups from metal sheets and form the multi-V-groove formations therein. Therefore, these smaller alternator pulleys are cast or machined, which increases considerably the cost thereof.

Accordingly, the need has existed for a multi-V-groove pulley having a generally flat, disc-shaped metal member molded within a multi-V-groove belt-receiving plastic formation which avoids the difficulties and undesirable characteristics present in prior all-metal multi-V-grooved pulleys and achieves results not obtainable with existing composite plastic metal pulleys.

SUMMARY OF THE INVENTION

Objectives of the invention include providing a new composite pulley construction having a metal, generally disc-shaped body or hub which can be die stamped easily and inexpensively from sheet metal, in which a multi-V-groove pulley formation of plastic is molded on an outer peripheral edge of the disc, in which the pulley formation is defined by a series of outwardly opening V-shaped grooves which preferably are located between a pair of enlarged, spaced belt-retaining, annular-shaped end projections, and in which the plastic supporting outer edge of the metal disc is formed with projections such as scallops to prevent rotation between the plastic pulley groove formation and the disc. Another objective is to provide such a composite pulley which is less expensive than the heretofore all-metal pulleys, which has sufficient strength at the location of the belt-receiving grooves without internal metal reinforcing members within the V-groove-forming plastic, and which provides better belt life and better pulley groove tolerances than believed possible with prior all-metal pulley constructions. Another objective is to provide such a composite pulley which is lighter in weight than all-metal pulleys without sacrificing the required strength and rigidity, in which the pulley groove formation can be molded easily on the metal disc during the molding operation, in which the pulley forming plastic material is less susceptible to rust and corrosion than prior all-metal pulleys, and in which the plastic has a self-lubricating effect which provides a better running relationship between the belt and pulley grooves to increase belt life and force transfer efficiency.

Another objective of the invention is to provide such a composite pulley for use as the alternator drive pulley, which pulley is smaller than the usual pulleys used for the other vehicle accessories and which has a relatively small diameter with respect to the axial length of the belt-receiving groove formation, in which the metal disc which provides the mounting means for the plastic V-groove pulley formation is formed with a central hole or opening coaxial with the axis of the hollow cylindrical bore of the plastic belt-receiving groove formation, in which the metal disc is mounted between the open ends of the hollow bore of the pulley groove formation, and in which the diameter of one of said open ends is sufficiently larger than the central opening of the metal disc to enable a tool to be inserted therein for clamping a nut against the metal disc for mounting the pulley on an alternator shaft. Another objective is to provide projections on the outer periphery of the metal disc, such as radially extending scallops, to assist the bonding of the plastic to the metal to prevent rotation between the metal disc and plastic pulley formation. A still further objective is to provide such a composite pulley which achieves the stated objectives effectively and efficiently, and which solves problems and satisfies needs existing in the multi-V-groove belt drive art and particularly in forming the smaller alternator drive pulleys.

These and other objectives and advantages may be obtained by the multi-V-groove composite plastic and metal pulley construction, the general nature of which may be stated as including a hollow, cylindrical-shaped multi-V-groove pulley formation formed of plastic having a series of outwardly opening V-shaped grooves and an axially extending central bore formed therein; and a generally flat metal disc located within the central bore of the plastic pulley formation and extending perpendicular with respect to the axis of said central bore, said disc being formed with a central opening and having an outer edge formed with projections, said projections being embedded within the plastic of the pulley formation with the disc opening being concentric with the central bore thereof for mounting the pulley construction on the shaft of a vehicle accessory.

BRIEF DESCRIPTION OF THE DRAWING

A preferred embodiment of the composite pulley construction of the invention, illustrative of the best mode in which applicant has contemplated applying the principles, is set forth in the following description and shown in the drawing, and is particularly and distinctly pointed out and set forth in the appended claims.

Similar numerals refer to similar parts throughout the drawing.

DESCRIPTION OF THE PREFERRED EMBODIMENT

Figure 1:
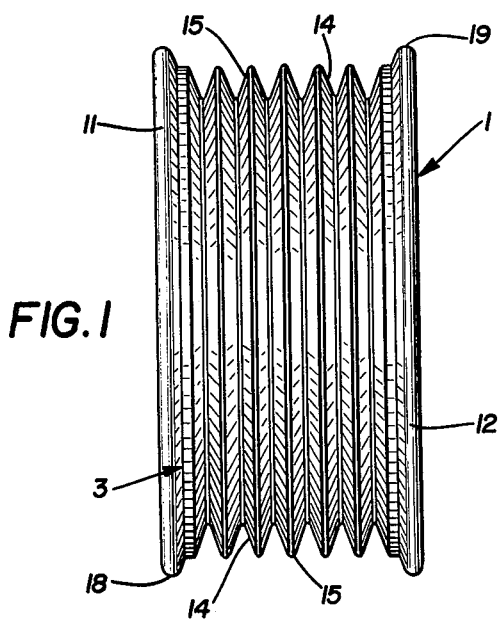
FIG. 1 is a side elevational view of the improved composite plastic pulley construction.
Figure 2:
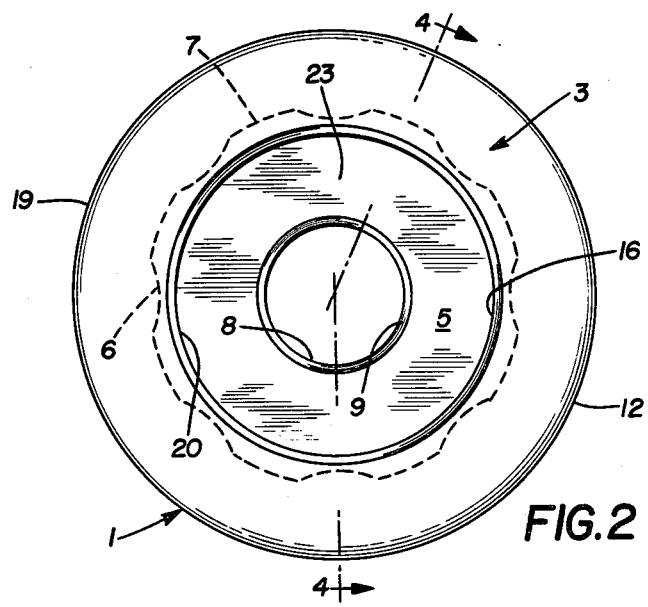
FIG. 2 is a right-hand end elevational view of the pulley of FIG. 1.
Figure 3:
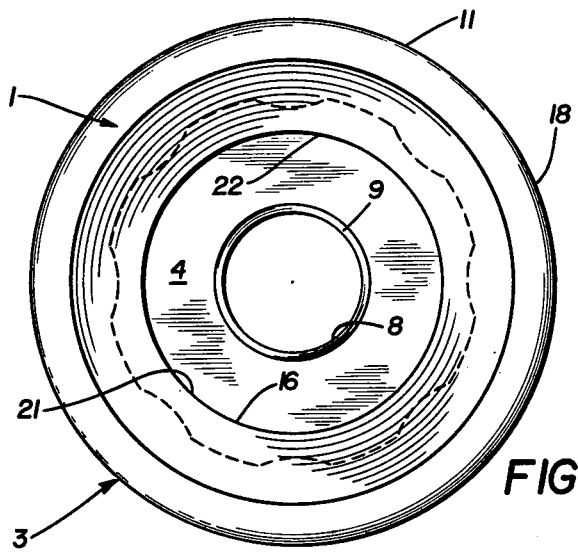
FIG. 3 is a left-hand end elevational view of the pulley of FIG. 1.
Figure 4:
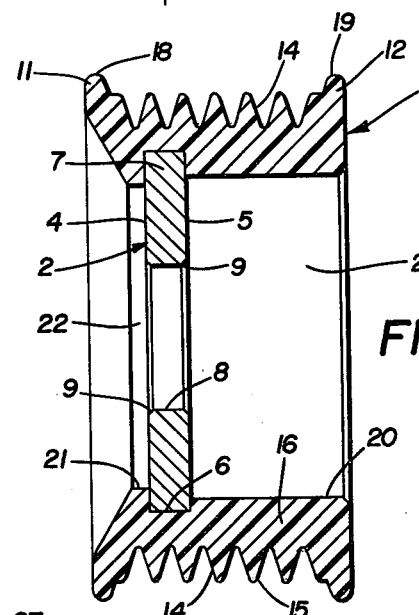
FIG. 4 is a sectional view taken on line 4—4, FIG. 2.

The improved composite pulley construction is indicated generally at 1, and is shown in FIGS. 1-4. Pulley 1 includes as its main components a generally disc-shaped metal member 2 and a multi-V-groove formation formed of plastic, indicated generally at 3. Disc 2, which is shown particularly in FIG. 5, has a generally flat configuration with parallel surfaces 4 and 5 and an outer peripheral edge 6. Edge 6 is formed with a plurality of radially extending projections, such as scallops 7. Disc 2 preferably is stamped from sheet steel such as 1010 or 1018 low carbon steel, and requires no machining, casting or other expensive manufacturing operation. A hole or opening 8 is formed in the center of disc 2, preferably during the stamping operation. The edges of hole 8 may be beveled at 9.

Figure 5:
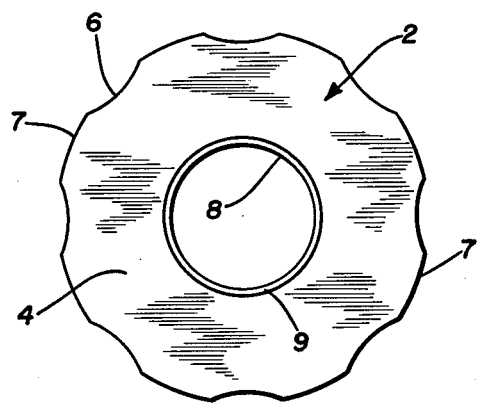
FIG. 5 is a plan view of the metal disc-shaped member of the improved pulley prior to being bonded within the plastic V-groove formation.

Thus, the composite pulley 1 consists of two pieces, the metal hub member 2 shown in FIG. 5 and the plastic body 3. The metal hub member 2 has an unbroken peripheral edge shaped with the scallops 7 as shown in FIG. 5. The plastic material surfaces of the outwardly opening V-shaped grooves 14 form the outer annular pulley surface.

Pulley formation 3 is supported on and molded to outer peripheral edge 6 of disc 2. Scallop projections 7 extend radially into the plastic of formation 3 and prevent relative rotation of disc 2 with respect to pulley formation 3. Pulley formation 3 includes a pair of spaced inner and outer belt-retaining annular flanges or end projections 11 and 12, which are formed integrally with a series of intervening outwardly opening V-shaped grooves 14. V-grooves 14 are formed between spaced pairs of inverted outwardly extending V-shaped projections 15 which are formed of plastic and project outwardly from a common integral base 16. The two endmost V-grooves 14 are formed by the endmost V-shaped projections 15 and the adjacent belt-retaining projections 11 and 12.

Belt-retaining projections 11 and 12 are formed integrally with base 16 and are of the same plastic material as are V-shaped projections 15. Retaining projections 11 and 12 preferably extend radially outwardly beyond the crests of projections 15 and prevent excess sideways movement of the belt with respect to multi-V-groove formation 5. The outer ends 18 and 19 of belt-retaining projections 11 and 12, respectively, are generally rounded to eliminate sharp edges which could possibly contact the moving drive belt damaging the same or injuring a mechanic or other individual performing maintenance on the vehicle engine.

Pulley formation 3 has generally hollow cylindrical configuration with a smooth inner bore 20 which extends completely through the formation. During the molding of the particular pulley configuration shown in the drawings and particularly FIG. 4 thereof, an annular end portion 21 is formed in bore 20 with a smaller diameter. This provides increased strength due to the proximity of disc 2 adjacent the inner open end 22 of formation 3. Bore 20 also terminates in an outer open end 23.

Although disc 2 is shown molded within pulley groove formation 3 closely adjacent the inner open end 22 thereof, it can be located at various locations axially along bore 20 without affecting the concept of the invention. The particular location of disc 2 is varied to meet the individual vehicle manufacturer's requirements, depending on the alternator construction on which pulley 1 will be mounted.

The particular plastic from which multi-V-groove formation 3 is formed may vary depending upon the various physical characteristics desired in the final pulley product. Broadly, the plastic will be a high temperature, reinforced thermoplastic or thermosetting plastic. Two types of particular plastics which have been found suitable for use in molding formation 3 are a phenolic plastic having a glass or mineral filler and sold by the Hooker Chemicals & Plastics Company of North Tonawanda, N.Y., under its trademark DUREZ, Grade No. 30645, and a phenolic plastic, glass fiber reinforced, manufactured by Rogers Corporation of Manchester, Conn., under its designation RX 862. Both of these types of plastics are high impact, heat resistant and asbestos free. Other types of plastics could be used in forming V-groove formation 3, although the above two types are believed to be quite satisfactory.

Figure 6:
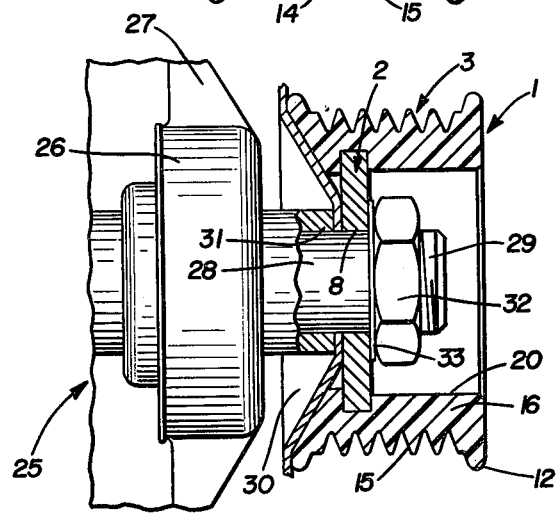
FIG. 6 is a fragmentary view, portions of which are in section, showing the mounting of the improved composite pulley on a shaft of an alternator.

FIG. 6 shows a typical mounting installation of improved composite pulley 1 on an alternator, indicated generally at 25. Alternator 25 includes a bearing assembly 26 located within a mounting bracket 27 for rotatably mounting alternator shaft 28. The outer end of shaft 28 is threaded at 29. Pulley 1, and particularly disc 2 thereof, will be clamped tightly against the end of a cooling fan 30 and a sleeve 31 by a nut 32. A washer 33 preferably is located between nut 32 and disc 2.

Although pulley 1 is relatively small in contrast to most vehicle accessory drive pulleys, the diameter of bore 20 must be sufficiently large to enable a tool to be telescopically inserted through open outer end 20 of formation 3. The extremely small size of pulley 1 is best illustrated by the following example, which is the particular size and proportion shown in the drawing. The axial length of pulley groove formation 3 between the outer end faces of belt-retaining flanges 11 and 12 is 1.16 inches and the diameter of end flanges 11 and 12 is 2.40 inches. The internal diameter of bore 20 is 1.50 inches and the internal diameter of reduced bore portion 21 is 1.41 inches. Disc 2 has a diameter of 1.57 inches, with the diameter between a diametrically opposed pair of scallops 7 being 1.67 inches. The diameter of shaft-receiving opening 8 of disc 2 is 0.67 inches. Also, the thickness of V-groove formation 3 measured radially between bore 20 and the peaks of V-shaped projections 15 is 0.35 inches. With this configuration, the diameter of the pulley groove formation 3 is approximately twice the axial length thereof, which is appreciably different from the heretofore larger pulleys used for the other vehicle accessory drives.

Pulley 1 provides a construction which has the advantages of an all-metal pulley as well as the advantages of a plastic pulley. The main body portion of the pulley can be stamped inexpensively from sheet metal by usual procedures to form disc-shaped member 2 having any desired size and configuration. Various projection means can be formed on the outer edge of the metal body whereby the plastic can be easily bonded thereto. The pulley grooves which are formed in plastic formation 3 provide better belt life and pulley groove tolerances than possible with the all-metal pulley. This composite pulley construction uses less plastic than prior composite plastic metal pulleys or all-plastic pulleys without sacrificing strength due to the particular V-groove formation thereof, and it enables a minimum of metal to be used for the disc-shaped body than in prior all-metal pulleys since additional metal is not required in an outer portion of forming the grooves. This results in both a lighter weight and less expensive pulley than prior all-metal pulleys.

As shown in FIG. 5, metal member 2 is a washerlike generally circular pulley mounting plate which has an axial opening 8 adapted to be telescoped over and clamped by a nut 32 to the end portion of an alternator shaft 28 for mounting the pulley on the alternator, as shown in FIG. 6. Plate 2 has flat surfaces (FIG. 4) that extend normal to the axis of its opening 8, and its generally circular peripheral edge 6 is formed with a plurality of circumferentially spaced slightly radially extending scallop projections 7. The plastic body 3 is ringlike in shape and has a large diameter inner cylindrical surface or bore 20 (FIG. 6), as shown, and the body has an outer annular typical poly-V-groove formation or shape in cross section. The plate scallops and peripheral edge portion extend into and are embedded in the body beneath the poly-V-grooves intermediate the annular flange projections 11 and 12, closer to flange 11 than 12, as shown.

Accordingly, the composite pulley construction is simplified, provides an effective, safe, inexpensive and efficient pulley which achieves all the enumerated objectives, provides for eliminating difficulties encountered with prior pulleys, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the composite plastic pulley is constructed and used, the characteristics of the construction, and the advantageous, new and useful results obtained, the new and useful structures, devices, elements, arrangements, parts, and combinations, are set forth in the appended claims.

I claim:

1. In a pulley of the poly-V-groove type for mounting on the shaft of a motor vehicle alternator driven by a single endless poly-V drive belt of a serpentine drive belt system in which the diameter of the poly-V grooves is approximately twice the axial length of the poly-V-grooves, wherein the improvement comprises:
    (a) a two-piece composite pulley consisting of a metal hub member and a poly-V-grooved plastic body;
    (b) the metal hub member consists of a washerlike generally circular flat metal pulley mounting plate having an axial opening adapted to be telescoped over and clamped by threaded connector means on an end portion of an alternator shaft;

(c) said washerlike plate extends normal to the axis of said opening and has a generally circular peripheral unbroken edge formed with a plurality of circumferentially spaced, slightly radially extending scallop projections;

(d) the plastic body has a molded ringlike shape having an inner cylindrical surface and an outer annular poly-V-groove plastic surface forming the outer annular pulley surface, said poly-V-grooved surface comprises a series of outwardly opening V-shaped grooves with crests therebetween, and the series of grooves terminates axially in an integral spaced pair of belt-retaining annular flanges which extend radially outwardly beyond the crests of said grooves; and (e) said metal hub member pulley mounting plate being located, when the ringlike plastic body is molded, axially concentric of the body and normal to the axis of the body intermediate the spaced pair of belt-retaining annular flanges at the ends of the body, with the scallops and peripheral edge portion of the flat washerlike plate embedded in and bonded nonrotatably to the body beneath the poly-V-grooves.

2. The construction defined in claim 1 in which said washerlike mounting plate is located axially closer to one end of said ringlike plastic body than to the other end thereof and is located adjacent the inner annular portion of the belt-retaining flange at said one end.

3. The construction defined in claim 2 in which the inner annular portion of said belt-retaining flange at said one end has a reduced diameter portion adjacent said mounting plate with respect to the diameter of the plastic body inner cylindrical surface.

* * * * *

UNITED STATES PATENT AND TRADEMARK OFFICE
CERTIFICATE OF CORRECTION

PATENT NO. : 4,473,363

DATED : September 25, 1984

INVENTOR(S) : Ben O. McCutchan, Jr.

It is certified that error appears in the above-identified patent and that said Letters Patent is hereby corrected as shown below:

Col. 4, line 58, the numeral "5" should be - 3 - ;

Claim 1, col. 6, line 61, the word - pulley - should be inserted before the word "grooves"

Signed and Sealed this

Nineteenth Day of February 1985

[SEAL]

Attest:

DONALD J. QUIGG

Attesting Officer　　Acting Commissioner of Patents and Trademarks